Nov. 21, 1967   N. G. POLGOV   3,354,261
ELECTRIC BUS ELEMENT WITH COOLANT PASSAGES
Filed March 16, 1966   2 Sheets-Sheet 1
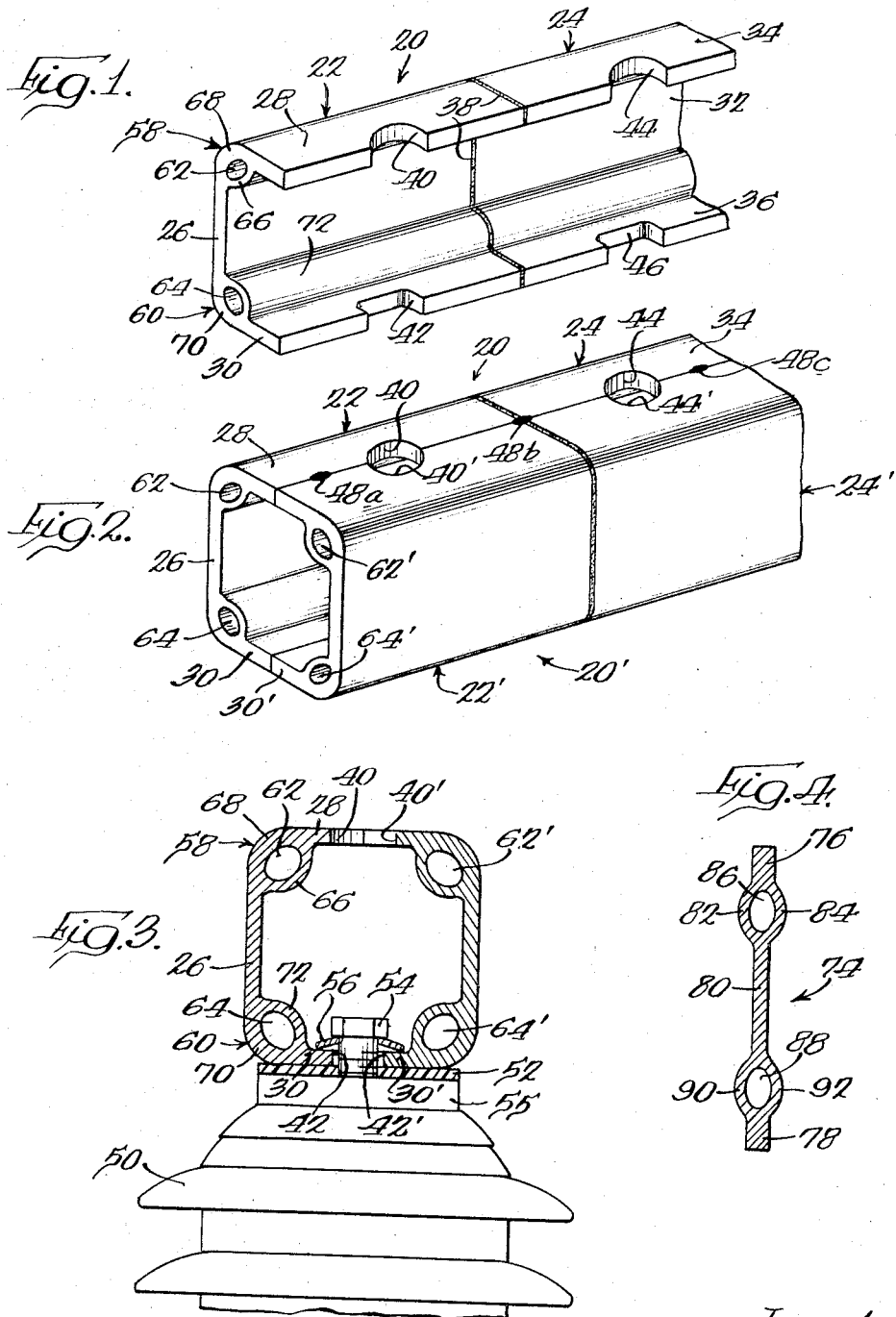
Inventor
Nicholas G. Polgov
By
Gary Parker, Juettner & Cullinan
Attys

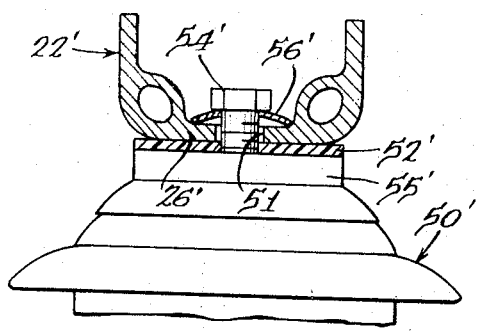
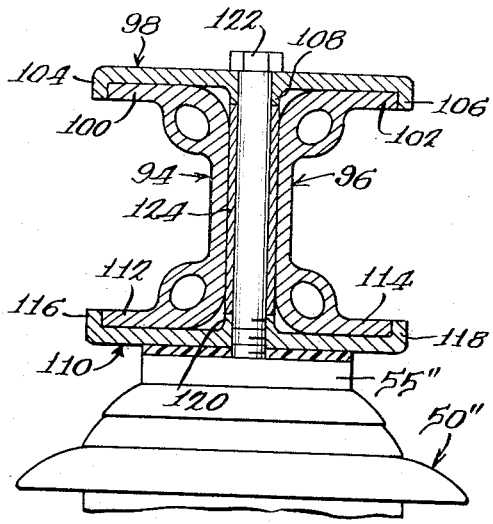
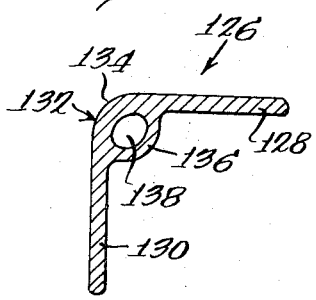
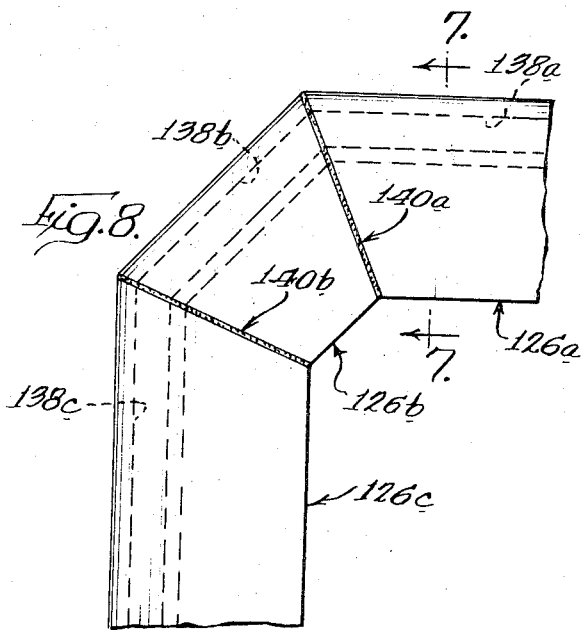

United States Patent Office 3,354,261
Patented Nov. 21, 1967

3,354,261
ELECTRIC BUS ELEMENT WITH COOLANT PASSAGES
Nicholas G. Polgov, Northbrook, Ill., assignor to H. K. Porter Company, Inc., Chicago, Ill., a corporation of Delaware
Filed Mar. 16, 1966, Ser. No. 534,724
10 Claims. (Cl. 174—133)

ABSTRACT OF THE DISCLOSURE

A current-carrying bus conductor element having limited areas of its cross section where current flow is relatively concentrated and having one or more ducts or coolant passages formed inside of a wall portion of the bus element and extending longitudinally therethrough in close proximity to an area of current flow concentration, the bus conductor element being suited for welding to other like bus elements in end-to-end relation therewith with the duct in one bus element in communication with a corresponding duct in an adjacent bus element.

---

The present invention relates to electric conductors for high ampere capacity electric power transmission, such conductors being of the type commonly referred to as buses. More specifically, the invention relates to an electric bus which is cooled by circulation of a coolant therethrough in order to increase the current carrying capacity of the bus.

It is known to provide an electric bus structure which is cooled through circulation of a coolant such as inert dry gas or filtered dry air therethrough, and buses which are cooled in this manner have the advantage that they can conduct more than three times the current carried by an uncooled bus. However, it has been customary heretofore to circulate the coolant in one direction through the interior of a hollow bus, and to return the coolant through a space between the exterior of the bus and a surrounding duct or housing which encloses the bus. Such an arrangement is not entirely satisfactory since it provides substantially uniform cooling of the entire bus structure, even though with many types of buses the current flow is highly concentrated at certain limited portions of the overall cross-sectional area of the bus.

It is therefore, an object of the present invention to provide an electric bus structure which embodies improved means for circulating a coolant through the bus so as to concentrate the coolant flow at certain areas of the cross-section of the bus where the current flow therethrough is also highly concentrated.

In furtherance of the foregoing object, I provide an electric bus of a type where the current flow is largely concentrated at certain limited portions of the overall cross-sectional area of the bus, and in closely adjacent relation to such areas of current concentration I provide passageways or traces for conveying a coolant. The coolant may comprise air, gas or a liquid, although a liquid coolant is preferred for use in conjunction with the present invention. In normal operation, certain ones of the traces are used to convey the coolant in one direction along the length of the bus, and the remaining traces are utilized as return passages to convey the coolant in the opposite direction. Maximum cooling efficiency is obtained due to the fact that the cross-sectional area of the traces or coolant passages is relatively small in comparison with the overall cross-sectional area of the bus structure, and such traces are located in close proximity to areas of current flow concentration, whereby the coolant is concentrated in certain predetermined areas where it can operate at maximum efficiency.

Another object of the invention is to provide an improved electric bus structure having a cross-sectional configuration which facilitates assembly of a plurality of bus elements and which also facilitates mounting of the bus at spaced insulator mounts.

The foregoing and other objects and advantages of the invention will be apparent from the following description thereof.

Now in order to acquaint those skilled in the art with the manner of practicing and utilizing my invention, I shall describe, in conjunction with the accompanying drawings, certain preferred embodiments of the invention.

In the drawings:

FIGURE 1 is a perspective view, partly broken away, showing a pair of channel-shaped bus elements constructed in accordance with the present invention and secured together in end-to-end relation;

FIGURE 2 is a perspective view, partly broken away, showing a pair of channel-shaped bus members each constructed as shown in FIGURE 1 and secured together in side-by-side relation to provide a generally square bus bar structure;

FIGURE 3 is a vertical sectional view, partly in elevation and partly broken away, showing the manner in which the square bus structure of FIGURE 2 may be secured to an insulator mount;

FIGURE 4 is a transverse sectional view showing an alternative form of the present invention as embodied in a bus of bar-shaped configuration.

FIGURE 5 is a vertical sectional view, partly in elevation, showing the manner in which a single channel-shaped bus element may be secured to an insulator mount;

FIGURE 6 is a vertical sectional view, partly in elevation, showing the manner in which two channel-shaped bus elements may be mounted in spaced apart back-to-back relation and held on an insulator mount by a pair of clamp plates;

FIGURE 7 is a transverse sectional view showing an angle-shaped bus element constructed in accordance with the present invention; and FIGURE 8 is a fragmentary top plan view showing the manner in which a plurality of angle-shaped bus elements of the type shown in FIGURE 7 may be welded together in end-to-end relation to form a 90 degree bus elbow.

Referring now to the drawings, FIGURE 1 shows a bus bar 20 comprising a pair of bus elements 22 and 24 which are substantially identical in their configuration and are butt welded together in end-to-end relation, it being understood that a large number of such bus elements may be secured end-to-end to provide a bus bar of any desired length. The bus element 22 is channel-shaped in its cross-sectional configuration, and it comprises a bight or wall portion 26 and a pair of flanges 28 and 30. The channel-shaped bus element 22 preferably comprises an aluminum extrusion, although if desired it may be made from copper or other suitable conductive material. In a similar fashion, the extruded bus element 24 comprises a bight or wall portion 32 and a pair of flanges 34 and 36. The two bus elements 22 and 24 are arranged in end-to-end relation and butt welded together as shown at 38. One of the advantages of the channel-shaped bus elements 22 and 24 is that in welding them together in end-to-end relation it is possible to extend the weld continuously around both the outside and the inside of the channel, thereby providing an extremely strong joint with electrical continuity and at the same time an effective seal between connecting traces in adjacent end-to-end bus sections.

It will be seen that with the bus element 22 oriented as shown in FIGURE 1, the outer edge of the upper channel flange 28 is provided intermediate its ends with a generally semi-circular notch 40, while the outer edge of the lower channel flange 30 is provided with a rectangular notch 42 in approximate alignment with the notch 40. The bus element 24 is of a similar configuration and has a semi-circular notch 44 formed in the outer edge of the upper channel flange 34, and a rectangular notch 46 formed in the outer edge of the lower channel flange 36.

FIGURE 2 shows the bus member 20 secured in side-by-side relation to a substantially identical bus member 20', the two channel members being combined to form a bus bar which is generally square in its cross-sectional configuration. The bus members 20 and 20' may be connected to one another by tack welding as indicated by way of example at 48a, 48b and 48c, it being understood that the bottom flanges 30 and 36 of the bus member 20 are also tack welded to the corresponding flanges of the bus member 20'.

When the two bus members 20 and 20' are welded together to form a generally square bus as shown in FIGURE 2, it will be understood that the semi-circular recesses such as at 40 and 40' in the upper channel flanges will be aligned with one another so as to define a generally circular opening 40, 40', and the rectangular notches such as at 42 and 42' in the lower channel flanges will also be aligned so as to define a generally square opening 42, 42'. When mounting the square bus 20, 20' of FIGURE 2 to an insulator member as shown at 50 in FIGURE 3, the bus bar is positioned on top of the insulator, with a washer or sheet 52 of anti-friction material such as Teflon disposed between the bus and the insulator. Thereafter, a bolt 54 may be inserted into the interior of the hollow bus through the upper circular opening 40, 40' and located in the lower square opening 42, 42', the mounting of the bus being effected by threading the bolt 54 into a metal cap 55 provided at the upper end of the insulator member 50. In order to accommodate expansion and contraction of the bus member, it is preferred that a dished Belleville washer or the like 56 be positioned under the head of the bolt 54 so as to overlie the channel flange portions 30 and 30'.

It will be understood that insulators such as the one shown at 50 are provided at spaced apart support stations along the length of the bus, and at each such support station the bus may be mounted to the corresponding insulator in the manner described hereinabove, there being no special clamps or the like required for such mounting. However, if desired, the two lengths of channel sections 20 and 20' may be independently positioned as shown in FIGURE 3 and secured to the insulator in the manner described, and thereafter the two channel-shaped bus members may be tack welded together to complete the formation of the unitary square bus structure.

One of the advantages of the bus structure described hereinabove is the convenience of field assembly and erection. Thus, the extruded channel-shaped bus elements 22, 24 etc. may be fabricated in predetermined lengths suitable for shipping purposes, and subsequently they may be butt welded on the job so as to secure them together in end-to-end relation and thereby provide a bus structure of any desired overall length. Thus, all straight runs may be constructed in the field, although elbows and bends and the like may if desired be prefabricated in the shop before shipment.

As previously stated, it is an important feature of the present invention that longitudinal coolant passages, ducts or traces are provided in the bus elements for conveying a coolant through the bus, and such traces are located in proximity to areas of localized current flow concentration. Referring for example, to the channel-shaped bus element 22 of FIGURE 1, the current flow will be heavily concentrated in the areas of the two outside corners 58 and 60. Accordingly, an additional thickness of material is provided at such corner areas, and a trace is formed adjacent each corner. Thus, a first trace or longitudinal passageway 62 is formed in the bus element 22 in close proximity to the outside corner 58, and a second trace 64 is formed in the bus in close proximity to the outside corner 60. The traces 62 and 64 extend for the entire length of the bus element 22, and it will be understood that similar traces may be formed in all other bus elements which are to be secured in end-to-end relation with the bus element 22. Thus, when the bus element 22 is butt welded in end-to-end relation to the bus element 24, the traces 62 and 64 will communicate respectively with substantially identical traces formed in the bus element 24. Moreover, by providing the continuous weld 38 around both the outside and the inside of the channel members to be joined, each of the traces 62 and 64 will be effectively sealed with respect to the corresponding traces in the adjacent bus section 24.

The trace 62 may be circular in cross section, or it may take other desired forms. However, in accordance with the preferred embodiment being described herein, the trace 62 is generally oval-shaped in its cross-sectional configuration, and the thickness of the adjacent inner web 66 is substantially less than the thickness of the adjacent outer corner wall 68. The outer corner wall 68 is made thicker for the reason that the current flow will tend to concentrate at the outside corner area, and the purpose in making the trace 62 generally oblong or oval-shaped is to permit a greater amount of the coolant to pass in close proximity to the outside corner area 58. The inner web 66 functions primarily to contain the coolant flow, and thus it may if desired be made quite thin. Where pipe connections are to be made at the ends of the traces it may be desirable to provide a short bore of circular cross-section at such end portions which may be tapped to receive a conventional pipe thread.

The trace 64 is formed in the same manner as described above and is enclosed by a relatively thick outside corner wall 70 and a relatively thin inside web portion 72. Similar traces indicated at 62' and 64' are also formed in the bus elements 22' and 24', so that when the bus members 20 and 20' are joined to form a generally square bus as in FIGURE 2, the resultant bus structure will be provided with a trace or longitudinal coolant passage in each of the four corners thereof. It will be understood that in normal operation a coolant will be conveyed in one direction through certain ones of the four traces and will be returned in the opposite direction through the remainder of the traces. However, if desired, the coolant may be conveyed in the same direction through all of the traces, and then returned by separate return means (not shown).

The above-described channel-shaped bus elements are highly advantageous since they can be manufactured in convenient lengths and welded end-to-end in the field to provide a bus of any desired length. They are particularly advantageous for the reason that they can be butt welded inside and out in order to seal together the adjacent end of corresponding traces. Moreover, they can be used in the form shown in FIGURE 1 if a channel-shaped bus is desired, or if greater current carrying capacity is required they may be joined together in side-by-side relation to provide a generally square bus structure. In either case, they can readily be mounted to an insulator member, such as shown in FIGURE 3 with respect to the square bus member, without need for any special mounting brackets or the like. The openings in the upper flanges such as shown at 40, 40' and 44, 44' not only serve to permit fastening bolts to be inserted into the hollow bus, and a wrench to be inserted therein to tighten such bolts, but they also function as air vent holes to assist in the cooling of the bus. If desired, additional air vent holes may be drilled for increased cooling.

FIGURE 5 shows the manner in which a single channel-shaped bus element 22' may be secured to an insulator member 50' by means of a bolt 54' which extends through an opening 51 formed in the web portion 26' of the bus and is threaded into a metal cap 55' provided at the upper end of the insulator member. The opening 51 is preferably elongated in the form of a slot so as to accommodate longitudinal expansion and contraction of the bus bar 22'. As in conjunction with the embodiment of FIGURE 3, a Belleville washer or the like 56' may be positioned under the head of the bolt 54' so as to overlie the channel web 26', and a washer 52' of anti-friction material such as Teflon may be disposed between the bus and the insulator.

FIGURE 4 illustrates an alternative embodiment of the invention comprising a bus member 74 in the form of a bar having relatively thick flat-sided end portions 76 and 78 and a relatively thin flat-sided central web portion 80. In a bar-shaped bus of the type being described, the current flow will be highly concentrated at the two end portions 76 and 78, and it is for this reason that these portions are designed to be substantially thicker than the central web 80. In addition, adjacent each of the thickened end portions 76 and 78 there is provided a corresponding trace or longitudinal coolant passageway. Thus, adjacent the end portion 76, the bus member comprises a pair of arcuate web portions 82 and 84 which define therebetween a trace 86. The trace 86 is shown as being oval-shaped, but it may be of circular or other desired cross-sectional configuration. A similar trace 88 is formed between a pair of arcuate web portions 90 and 92 adjacent the opposite end 78 of the bus member.

It will be understood that a large number of bar-shaped bus elements of the type shown in FIGURE 4 may be butt welded together in end-to-end relation to provide a bus member of any desired length, and the weld may be extended continuously around both sides of the bus so as to form a complete seal between the traces in one bus section and the corresponding traces in an adjacent section. A suitable coolant may be conveyed in one direction through the trace 86 and returned in the opposite direction through the trace 88, or if desired the coolant may be conveyed in the same direction through the two traces and returned in a separate return member (not shown). In either case, the coolant is concentrated in close proximity to the thickened end portions of the bus where the current flow is also highly concentrated.

FIGURE 6 illustrates the manner in which a pair of channel-shaped bus members 94 and 96 may be mounted in spaced back-to-back relation and secured to an insulator mount 50''. An upper clamp plate 98 is disposed horizontally so as to overlie the upper flanges 100 and 102 of the bus members 94 and 96, and the clamp is provided with depending side rim portions 104 and 106 which overlie the ends of the flanges 100 and 102 and retain the bus members in position. A central depending rib 108 on the upper clamp plate 98 projects down between the web corner portions of the two buses to provide for spacing therebetween. A lower clamp plate 110 substantially identical to the upper clamp 98 is disposed in a horizontal plane beneath the lower flanges 112 and 114 of the bus members, and side rim portions 116 and 118 and a central rib 120 project upwardly and serve to position the bus members in the manner described above regarding the upper clamp plate.

A clamping bolt 122 extends downwardly through the upper clamp plate 98, through a tubular spacer 124, and through the lower clamp plate 110 into a metal cap 55'' provided at the top of the insulator mount. The bolt 122 serves to hold the two clamp plates 98 and 110 together with the two bus members clamped therebetween, and the end of the bolt is threaded into the cap 55'' so as to secure the entire bus assembly to the insulator mount 50''. The tubular spacer 124 controls the spacing between the two clamping plates 98 and 110 and provides sufficient space for expansion of the bus members. If desired, a pair of flat spring spacer members (not shown) may be disposed between the upper clamp plate 98 and the upper channel flanges 100 and 102 to prevent bus chatter. The foregoing structure has the advantage of comprising a relatively simple mounting arrangement for the two channel-shaped bus members, and in addition it is a simple matter with such a mounting arrangement to provide tap-off connections by drilling or punching holes in the two channel webs or in the flanges and using bolts and nuts to secure the tap-off connections.

FIGURE 7 shows a bus in the form of an angle bar 126 comprising a pair of flanges 128 and 130 whcih join at a corner 132 having a relatively thick outer web 134 and a relatively thin inner web 136 between which is disposed a longitudinal coolant passageway or trace 138. FIGURE 8 illustrates the manner in which a 90 degree bus elbow may be fabricated from three bus angle sections 126a, 126b and 126c of the type shown in FIGURE 7. The corner section 126b is generally trapezoidal in top plan view and the adjoining sections 126a and 126c each have inclined end portions which are complementary to the inclined end portions of the corner section. Thus, the three bus sections are welded together at their adjoining end portions to form welded joints 140a and 140b, and the resultant structure comprises a 90 degree bus elbow which will offer relatively little resistance to the flow of coolant through the trace 138 therein. At each joint the weld may extend continuously around both the outside and the inside of the angle members thus providing an extremely strong joint with electrical continuity and at the same time an effective seal between the connecting trace portions 138a, 138b and 138c.

The current carrying capacity of the particular bus structures described herein will normally be in the range of 5000 to 21,000 amperes, although the invention is not limited in this respect. Moreover, it should be understood that it is an important feature of the invention to provide a bus structure having traces formed inside the wall portions thereof which traces represent only a small portion of the overall cross sectional area of the bus and which are located closely adjacent areas of current flow concentration, the latter areas preferably being of increased wall thickness. I have specifically described channel-shaped bus elements which may be used as such, may be joined together to provide a generally square bus structure, or may be clamped in spaced back-to-back relation. I have also described a bus structure in the form of a bar having relatively thick end portions and a relatively thin web, and another bus structure in the form of an angle having two approximately perpendicular flange portions. However, the bus elements may take other forms, within the scope of the present invention. Also, the bus structures of the present invention may be used in the open air, or they may be enclosed in sealed metal housings, depending upon the particular application. Thus, while I have described my invention in certain preferred forms, I do not intend to be limited to such forms, except insofar as the appended claims are so limited, since modifications within the scope of my invention will readily occur to others, particularly with my disclosure before them.

I claim:

1. In a bus structure of the type which is cooled to increase the current-carrying capacity thereof, the improvement comprising, in combination, a bus conductor element including a pair of walls which intersect to define a corner where current flow is relatively concentrated, said corner being of increased thickness relative to the thickness of said pair of walls, and a duct formed inside of said corner in close proximity to the area of current concentration, said duct extending longitudinally through said bus element for conducting a coolant therethrough.

2. The invention of claim 1 wherein the portion of said corner area outside of said duct is relatively thick compared to the portion of said corner area inside of said duct.

3. The invention of claim 2 wherein said duct is generally oval-shaped in its cross-sectional configuration and is oriented so that the major axis thereof is approximately perpendicular to a line which bisects a corner angle defined by said pair of walls.

4. The invention of claim 1 wherein a plurality of said bus elements are welded together in end-to-end relation with the duct in one bus element in communication with a corresponding duct in an adjacent bus element, said weld being extended continuously both on the outside and on the inside of adjacent ends of said bus elements to provide an effective seal between the adjacent ends of said ducts.

5. The invention of claim 4 wherein each of said bus elements comprises an angle bar having a pair of approximately perpendicular flanges which join at a corner area of current concentration, and wherein a duct is formed inside of said corner area.

6. The invention of claim 4 wherein each of said bus elements is channel-shaped in its cross-sectional configuration so as to have two corner areas where current flow is relatively concentrated, and wherein a duct is formed inside of each of said corner areas.

7. The invention of claim 6 wherein two of said channel-shaped bus elements are welded together in side-by-side relation to provide a generally square bus member having a duct formed in each of the four corners thereof.

8. In a bus structure of the type which is cooled to increase the current-carrying capacity thereof, the improvement comprising, in combination, a bus conductor element in the form of a bar having two relatively thick substantially flat-sided end portions and a relatively thin substantially flat-sided intermediate web portion, said thick end portions comprising areas of current flow concentration, and a pair of spaced apart ducts formed inside of said bar-shaped bus element, each of said ducts being in close proximity to a corresponding one of said thick end portions, and said ducts extending longitudinally through said bus element for conducting a coolant therethrough.

9. In a bus structure of the type which is cooled to increase the current-carrying capacity thereof, the improvement comprising, in combination, a plurality of bus conductor elements each having a plurality of spaced apart limited areas of its overall cross section where current flow is relatively concentrated, and a plurality of spaced apart ducts formed inside of respective wall portions of each said bus element, said ducts extending longitudinally through said bus element for conducting a coolant through the wall thereof, and each of said ducts being generally oval-shaped in its cross-sectional configuration and being located in close proximity to a corresponding one of said areas of current flow concentration, said plurality of bus conductor elements being welded together in end-to-end relation with the ducts in one bus element in communication with corresponding ducts in an adjacent bus element.

10. The invention of claim 8 where each of said ducts is generally oval-shaped in its cross-sectional configuration.

References Cited

UNITED STATES PATENTS

| | | | |
|---|---|---|---|
| 2,138,617 | 11/1938 | Scott | 174—129 |
| 3,226,602 | 12/1965 | Elfving | 317—243 X |
| 3,297,082 | 1/1967 | Tranel | 165—170 |

FOREIGN PATENTS

| | | |
|---|---|---|
| 284,774 | 2/1928 | Great Britain. |

LEWIS H. MYERS, *Primary Examiner.*

E. GOLDBERG, *Assistant Examiner.*